United States Patent
Persson et al.

(10) Patent No.: US 9,494,992 B2
(45) Date of Patent: Nov. 15, 2016

(54) MULTI-CORE PROCESSOR SYSTEM AVOIDING STOPPING OF CORES TOO CLOSE IN TIME

(71) Applicant: STMicroelectronics International N.V., Amsterdam (NL)

(72) Inventors: Hakan Persson, Bjarred (SE); Christophe Viroulaud, Seyssinet-Pariset (FR)

(73) Assignee: STMICROELECTRONICS INTERNATIONAL N.V., Amsterdam (NL)

( * ) Notice: Subject to any disclaimer, the term of this patent is extended or adjusted under 35 U.S.C. 154(b) by 186 days.

(21) Appl. No.: 14/486,042

(22) Filed: Sep. 15, 2014

(65) Prior Publication Data

US 2015/0082060 A1    Mar. 19, 2015

(30) Foreign Application Priority Data

Sep. 16, 2013 (EP) .................................. 13368033

(51) Int. Cl.
     *G06F 1/32*      (2006.01)
     *G06F 1/08*      (2006.01)

(52) U.S. Cl.
     CPC ............... *G06F 1/3203* (2013.01); *G06F 1/08* (2013.01); *G06F 1/324* (2013.01); *G06F 1/3287* (2013.01); *G06F 1/3296* (2013.01); *Y02B 60/1217* (2013.01); *Y02B 60/1282* (2013.01)

(58) Field of Classification Search
     CPC .... G06F 1/324; G06F 1/3237; G06F 1/3296; G06F 1/3203; G06F 1/3287; Y02B 60/1221
     USPC ......................................... 713/322, 320, 323
     See application file for complete search history.

(56) References Cited

U.S. PATENT DOCUMENTS

| | | | |
|---|---|---|---|
| 6,304,978 B1 | 10/2001 | Horigan et al. | |
| 2005/0188235 A1 | 8/2005 | Atkinson | |
| 2007/0220289 A1* | 9/2007 | Holle | G06F 1/3203 713/300 |
| 2009/0150695 A1* | 6/2009 | Song | G06F 1/00 713/323 |
| 2009/0172423 A1* | 7/2009 | Song | G06F 1/3203 713/300 |
| 2012/0066535 A1* | 3/2012 | Naffziger | G06F 1/206 713/340 |
| 2012/0216064 A1* | 8/2012 | Ko | G06F 1/3206 713/324 |

FOREIGN PATENT DOCUMENTS

| | | |
|---|---|---|
| WO | WO-0203185 A2 | 1/2002 |
| WO | WO-2012064537 A2 | 5/2012 |

OTHER PUBLICATIONS

EPO Search Report and Written Opinion for EP 13368033 dated Dec. 19, 2013 (7 pages).

* cited by examiner

*Primary Examiner* — Thomas Lee
*Assistant Examiner* — Santosh R Poudel
(74) *Attorney, Agent, or Firm* — Gardere Wynne Sewell LLP

(57) ABSTRACT

A power consumption management system for a central processing unit may include a power consumption estimation block and an activity control block. The power consumption estimation block may be configured to estimate power consumption of the central processing unit based on information related to a status of the central processing unit. The activity control block may be configured to use the estimated power consumption to determine a control to be applied to the central processing unit for regulating a rate of change in power consumption of the central processing unit.

17 Claims, 2 Drawing Sheets

MULTI-CORE PROCESSOR SYSTEM AVOIDING STOPPING OF CORES TOO CLOSE IN TIME

RELATED APPLICATION

This application claims the benefit of European Patent Application No. 13368033.0, filed Sep. 16, 2013, the contents of which are hereby incorporated by reference to the maximum extent allowable by law.

FIELD OF THE DISCLOSURE

The present disclosure generally relates to devices and methods for managing power consumption of a central processing unit.

BACKGROUND

Certain Central Processing Unit (CPU) management methods have been devised. For example, U.S. Pat. Pub. 2009/0265572 (the disclosure of which is hereby incorporated by reference) describes a method for performing a CPU soft start, the method including controlling the voltage of a power supply to match a specific frequency. U.S. Pat. Pub. 2004/0221287 (the disclosure of which is hereby incorporated by reference) also describes a method for performing a CPU soft start, the method including controlling different clock sources used in low power and normal operation states. U.S. Pat. No. 7,219,245 (the disclosure of which is hereby incorporated by reference) describes a method for adapting CPU frequency based on idleness and types of instructions to be executed. U.S. Pat. No. 6,564,328 (the disclosure of which is hereby incorporated by reference) describes method for controlling CPU temperature by regulating frequency based on a power consumption estimation. U.S. Pat. Pub. 2009/0259869 (the disclosure of which is hereby incorporated by reference) describes a method for estimating the power consumption of a processing core. U.S. Pat. Pub. 2009/0089598 (the disclosure of which is hereby incorporated by reference) and U.S. Pat. Pub. 2005/0132238 (the disclosure of which is hereby incorporated by reference) describe methods for adjusting processor frequency based on hardware feedback, processor stall, instructions, thread level run time, etc. However, CPU power supply integrity is not considered as a concern in these cited documents.

The performance of CPUs on integrated circuits is tightly connected to the CPU power supply integrity. For each operating frequency there is a threshold operating voltage that should hopefully be sustained to help ensure correct operation. The more noise that is present on the power supply, the larger the margin is to be used for the nominal voltage versus the minimum operating voltage in order to ensure the threshold operating voltage is met.

In general, the largest source for noise on the CPU power supply is the variations on the current drawn by the CPU itself. Two methods may help mitigate the effects of these variations.

A first method involves the use of special analog circuitry to detect low levels on the CPU supply voltage, and modify the operating frequency of the CPU to mitigate the low supply voltage level, as well as reduce the supply voltage required for correct operation. However, this method is complicated to implement and depends on analog functionality being developed for every process node.

A second method involves the use of software to control the operating frequency for the CPU when transitioning to and from an idle state. Transitions to and from an idle state can cause sharp changes in the current consumed by the CPU, and are typically the worst case for noise on the power supply. However, this method is complicated to implement with full efficiency, because it is difficult for software to cover the different possible ways to enter and exit idle state, especially for multi-core CPUs.

Embodiments of the disclosure described herein will improve the situation.

SUMMARY

A first aspect of the present disclosure relates to a power consumption management system for a central processing unit. This system may include a power consumption estimation block configured to estimate a power consumption of the central processing unit based on information related to a status of the central processing unit, and an activity control block configured to use the estimated power consumption to determine a control to be applied to the central processing unit for regulating a rate of change in power consumption of the central processing unit. This system permits improvement of performance of central processing units (CPU) by regulating the CPU power consumption.

The activity control block may be configured to test whether the power consumption of the central processing unit may be a sharp change, with the sharp change being detected when the difference between the estimated power consumption and a target power consumption exceeds a threshold.

The activity control block may be configured to determine a clock frequency to be used in the central processing unit, with the power consumption management system also including a clock generator block configured to generate a clock signal based on a clock frequency determined by the activity control block, and to transmit the generated clock signal to the central processing unit.

The clock generator block may be configured to adjust the clock frequency of the central processing unit in several small steps above or below a given nominal frequency. The activity control block may further be configured to transmit an interrupt request to the central processing unit. Information related to a status of the central processing unit may include data related to an idle status, data related to a pipeline stall, and/or data related to a type of instruction executed by the central processing unit.

According to embodiments of the disclosure, the central processing unit may be a dual core central processing unit, with information related to a status of the central processing unit including data related to an idle status of each core of the central processing unit.

Information related to a status of the central processing unit may be used to determine a state of the central processing unit among a set of possible states of the central processing unit. These states may include an idle state determined when both cores of the central processing unit are in a wait for interrupt state, a first start state determined once at least one core is running, a second start state determined when the at least one core which is running stays active until the expiration of a first timer, a run state determined when the at least one core which is running stays active until the expiration of a second timer, a first stop state determined when at least one core stop running, and a second stop state determined when the at least one core which has stopped running stays inactive until the expiration of a third timer.

The power consumption rate of change may be regulated by manipulating the clock frequency of the central processing unit between a first clock frequency and a second clock frequency, with the second clock frequency being equal to half the first clock frequency.

The use of two clock frequencies may permit control of central processing unit startup and shutdown to reduce power supply transients by limiting clock speed when starting from idle state (WFI/WFE), and helping ensure that entry into idle state (WFI/WFE) is not simultaneous for both cores.

A second aspect of the present disclosure relates to a power consumption management method for a central processing unit. The method may include estimating a power consumption of the central processing unit based on information related to a status of the central processing unit, and using the estimated power consumption to determine a control to be applied to the central processing unit for regulating a rate of change in power consumption of the central processing unit.

The method may comprise testing whether the power consumption of the central processing unit may be a sharp change, with a sharp change being detected when the difference between the estimated power consumption and a target power consumption exceeds a predetermined threshold.

The method may comprise determining a clock frequency to be used in the central processing unit, an operation for generating a clock signal based on a clock frequency determined by the activity control block, and an operation for of transmitting the generated clock signal to the central processing unit. The method may also include transmitting an interrupt request to the central processing unit.

Information related to a status of the central processing unit may include data related to an idle status, data related to a pipeline stall, and/or data related to a type of instruction executed by the central processing unit.

A third aspect of the present disclosure relates to a non-transitory computer program product including one or more sequences of instructions being accessible to a processor and which, when executed by the processor, cause the processor to carry out the operations of the method as described above.

BRIEF DESCRIPTION OF THE DRAWINGS

The present disclosure is illustrated by way of example, and not by way of limitation, in the figures of the accompanying drawings, in which.

DETAILED DESCRIPTION

Embodiments of the disclosure deal with the problem of improving performance of a Central Processing Unit (CPU) by regulating the CPU power consumption.

Figure 1:
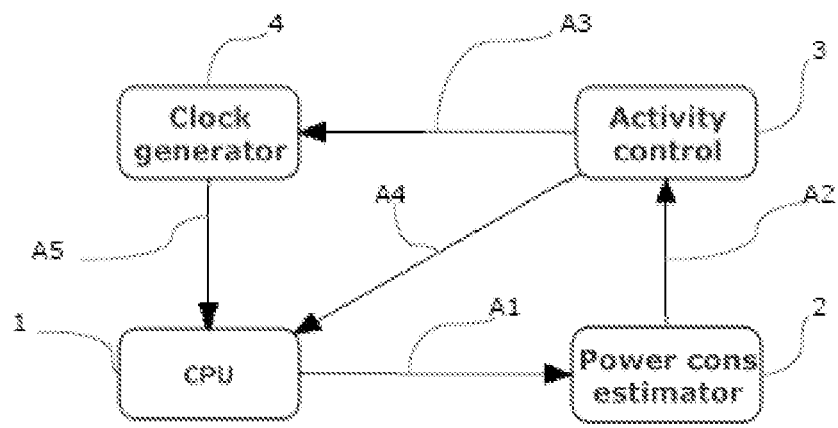
FIG. 1 is a schematic block diagram of a power consumption management system according to embodiments of the disclosure.

FIG. 1 shows a power consumption management system configured to use digital logic to monitor the status of a CPU 1, to estimate a power consumption of the CPU 1, and to limit the rate of change for the power consumption of the CPU 1. According to an example embodiment, the CPU 1 is a dual core CPU.

The power consumption management system may include a power consumption estimation block 2, an activity control block 3, and a clock generator block 4. The power consumption estimation block 2 may be configured to estimate a power consumption of the CPU 1 based on information related to a status of the CPU 1. Information related to the status of the CPU 1 may be received from the CPU 1, as symbolized by arrow A1. The power consumption estimation block 2 may be further configured to transmit to the activity control block 3 a message comprising information related to an estimated power consumption, as symbolized by arrow A2.

The activity control block 3 may be configured to determine a clock frequency to be used in the CPU 1 based on the estimated power consumption. The activity control block 3 may be further configured to transmit a clock frequency adjustment request to a clock generator block 4, as symbolized by arrow A3, and to transmit an interrupt request to the CPU 1, as symbolized by arrow A4.

The clock generator block 4 may be configured to generate a clock signal based on a clock frequency determined by the activity control block 3, and to transmit the generated clock signal to the CPU 1, as symbolized by arrow A5.

Figure 2:
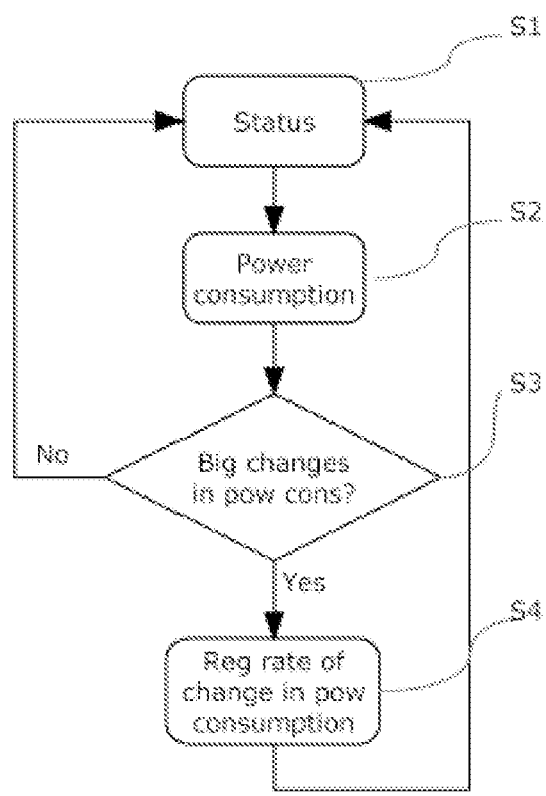
FIG. 2 is a flow chart showing a method of managing power consumption according to embodiments of the disclosure.

Referring to FIG. 2, a power consumption management method according to embodiments of the disclosure will now be described. The method may be executed in the system of FIG. 1.

In operation S1, information related to a status of the CPU 1 is collected in the power consumption estimation operation 2.

Information related to a status of the CPU 1 may include various types of data, for example data related to an idle status, data related to a pipeline stall, and/or data related to a type of instruction executed by the CPU 1.

According to the example embodiment in which the CPU 1 is a dual core CPU, the collected information may for instance comprise data related to an idle status of each core of the CPU 1.

In this example embodiment, the power consumption estimation block 2 may use the idle status information to determine a state of the CPU 1 among a set of possible states of the CPU 1. The set of possible states comprises an idle state, a first start state, a second start state, a run state, a first stop state and a second stop state.

The idle state may be determined when both the CPU cores are in a wait for interrupt (WFI/WFE) state.

Once at least one CPU core is running, the first start state may be determined. During this state, if both cores stop running the idle state may be entered. If at least one core stays active until the expiration of a first timer, a transition may be made to a second start state.

During the second start state, if both cores stop running, the idle state may be entered immediately. If at least one core stays active until the expiration of a second timer, a transition may be made to the run state.

The run state is the state for sustained operation. During this state, a configuration signal may be used to control whether a soft stop function is activated. If the soft stop function is deactivated then in case both cores stop running a transition is made to the idle state. If the soft stop function is activated, then in case at least one core stops running, a transition may be made to a first stop state.

During the first stop state, if the idle core is restarted, then a transition may be made to the run state, otherwise a transition may be made to the second stop state when a third timer expires.

First, second and third timers may allow a range of about 10 µs, and support 52 MHz clock frequency. A minimum count of about 500 may be used.

The second stop state may indicate that a single (i.e. the last) core has been running long enough to stop it without an excessive transient. If the second (i.e. idle) core is restarted, a transition is made to the run state, otherwise if the last core is stopped the idle state is entered.

In operation S2, the power consumption estimation block 2 estimates a power consumption of the CPU 1 based on the CPU related information. Then, the power consumption estimation block 2 transmits to the activity control block 3 a message indicating the estimated power consumption.

In operation S3, the activity control block 3 tests whether the power consumption of the CPU 1 may include a sharp change. For example, the estimated power consumption may be compared to a target power consumption, and a sharp change may be detected when the difference between the estimated power consumption and the target power consumption exceeds a predetermined threshold.

The target power consumption may be adjusted either at regular intervals or a specific time after certain events (such as wakeup of the CPU 1 from idle state). When a sharp change is detected, the method goes to operation S4. Otherwise the method returns to operation S.

In operation S4, the activity control block 3 may determine a control to be applied to the CPU 1 for regulating the rate of change in power consumption. Then, the activity control block 3 may transmit a control message, for example a clock frequency adjustment request, to the clock generator block 4, and/or an interrupt request, which is transmitted to the CPU 1.

For example, the power consumption rate of change may be regulated by adjusting the clock frequency to be used in the CPU 1, up or down, depending on direction of change in estimated power consumption.

According to example embodiments, the clock generator block 4 is able to adjust the CPU clock frequency in several small steps above/below around a given nominal frequency, for example by adjusting the period time in 1/16 or other fractions of the nominal period time. The power consumption rate of change may further be regulated by generating events for CPU 1 to process, for example in case estimated power consumption falls very quickly.

According to example embodiments, the power consumption rate of change may be regulated by manipulating the clock frequency between a first clock frequency, called full frequency, and a second clock frequency, called half frequency. The second clock frequency may be equal to half the first clock frequency. The power consumption rate of change may further be regulated by generating an interrupt request, for example in case both CPU cores become idle suddenly.

For instance, when the CPU 1 has been determined as being in the idle state, the clock frequency may be set to the half frequency to ensure that when the CPU 1 wakes up it starts with the reduced frequency.

When the CPU 1 has been determined as being in the first start state, the clock frequency may also be set to the half frequency. The first start state helps to ensure that CPU 1 starts at half speed to reduce initial transient, as well as give timing margin through reduced frequency.

When the CPU 1 has been determined to be in the second start state, the clock frequency may be set to the half frequency or to the full frequency depending on the number of CPU cores running. The clock frequency may be set to the full frequency if one core is running. The clock frequency is set to the half frequency if both cores are running. This permits reducing the impact of the second core being activated at the same time as the first timer expires.

When the CPU 1 has been determined as being in the run state, the clock frequency is set to the full frequency. When the CPU 1 has been determined as being in the first stop state, the clock frequency is set to the half frequency or to the full frequency depending on the number of cores running.

The first stop state is intended to block the CPU 1 from stopping both cores too close in time, i.e. to delay the stopping of the last core. An enable idle output may be activated to generate an interrupt for preventing the last core from stopping.

When the CPU 1 has been determined as being in the second stop state, both CPU cores may be stopped. The second stop state indicates that a single (i.e. the last) core has been running long enough to stop it without excessive transient.

There are several possible implementations of the soft start-stop. According to a first implementation, the system uses an interrupt request (IRQ) when both CPU cores are idle. According to this implementation, if the CPU 1 is in the first stop state, the interrupt request may be issued again when both cores are in the idle state.

According to a second implementation, the system enables interrupt on interrupt request (IRQ) immediately before going idle. Interrupt may in this case happen before the idle state for the last core is entered. Thus, according to this implementation, the last core may not stop running and no potential transient may happen between execution of WFI instruction and IRQ trigger.

Figure 3:
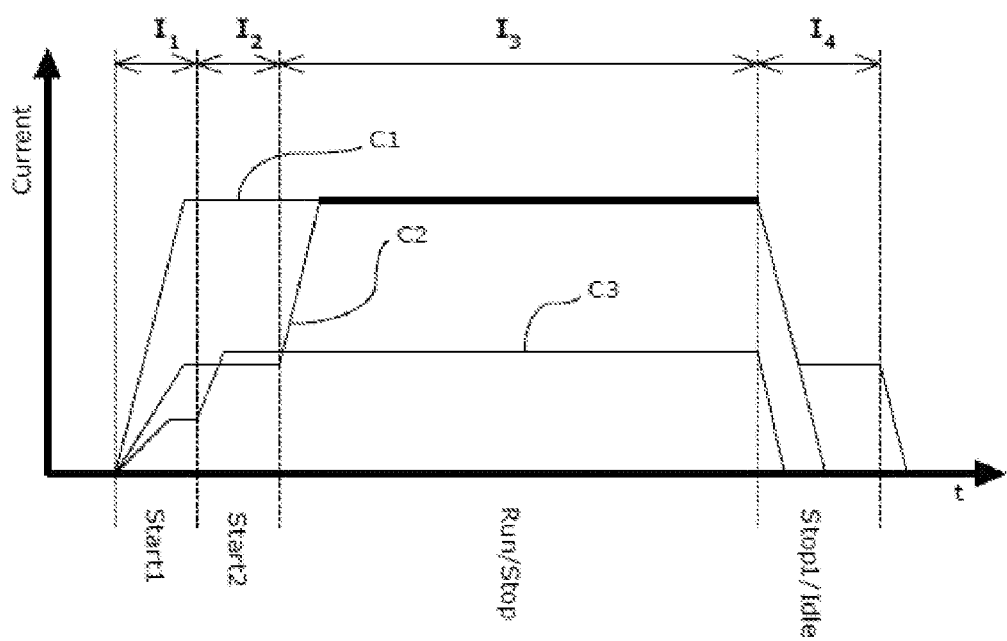
FIG. 3 is a chart which shows curves giving current versus time for central processing units according to embodiments of the disclosure.

FIG. 3 represents curves giving current versus time, for various types of CPU. Curve $C_1$ is a curve giving current versus time for a two-core CPU without power consumption management. Curves $C_2$ and $C_3$ are curves giving current versus time, respectively for a two-core CPU and for a one core CPU, with power consumption management according to embodiments of the disclosure in which a power consumption rate of change is regulated by manipulating the clock frequency between a full clock frequency and a half clock frequency.

During a first interval $I_1$, CPUs are started. In the system represented in curve $C_1$, the clock frequency of the CPU may be immediately set to the full clock frequency and then the current may immediately take a maximum value. Sharp changes are consequently generated in the power consumption of the CPU.

On the contrary, with the power consumption management system according embodiments of the disclosure, CPUs are determined as being in the first start state and the clock frequency is set to the half clock frequency, as represented in curves $C_2$ and $C_3$. Consequently CPU power consumption changes are limited.

During a second interval $I_2$, CPUs are running. In the system represented in curve $C_1$, the clock frequency is maintained at a full clock frequency. On the contrary, with the power consumption management system according to embodiments of the disclosure, CPUs are determined as being in the second start state and the clock frequency is set to the half frequency or to the full frequency depending on the number of CPU cores running. Curve $C_3$ is related to a one core CPU, so the clock frequency is set to the full clock frequency. Curve $C_2$ is related to a two core CPU and both cores are running, so the clock frequency is set to the half clock frequency.

During a third interval $I_3$, the CPU clock frequency is still maintained to full clock frequency in prior art system represented in curve $C_1$.

Curve $C_2$ related CPU is determined as being in the run state and its clock frequency is set to the full clock frequency. Curve $C_3$ related CPU is determined as being in the first stop state and its clock frequency is maintained to the full clock frequency.

During a fourth interval $I_4$, CPUs are stopped. With system represented in curve $C_1$, the clock frequency may be immediately stopped and then the current may fall very quickly. Sharp changes may be consequently generated in the power consumption of the CPU.

On the contrary, with the power consumption management system according embodiments of the disclosure, curve $C_2$ related CPU is determined as being in the first stop state and its clock frequency is set to the half clock frequency. Consequently CPU power consumption changes are limited. Curve $C_3$ related CPU was already in the first stop state and may then be stopped without generating sharp changes in the power consumption.

The feedback from a change of idle state for a core to a change in clock frequency/generating an interrupt is preferably performed quickly. An initial transient peak is reached in about 10 ns. Thus, the control loop from WFI/WFE to the clock generation/IRQ is preferably implemented without resynchronizing to the power management controller and interface (PRCMU) clock, i.e. it should be combinatorial with "semi-static" control signals clocked by the PRCMU clock.

The power consumption management system may permit reduction of the transient voltage drop by about 30 mV. This roughly corresponds to an increase of the maximum operating frequency of about 30 MHz or alternatively, depending on if the transient improvement is used to increase clock frequency or reduce nominal operating voltage, to reduce the overall CPU power consumption of about 5%.

While there has been illustrated and described what are presently considered to be the preferred embodiments of the present disclosure, it will be understood by those skilled in the art that various other modifications may be made, and equivalents may be substituted, without departing from the true scope of the present disclosure. Additionally, many modifications may be made to adapt a particular situation to the teachings of the present disclosure without departing from the central inventive concept described herein. Furthermore, an embodiment of the present disclosure may not include all of the features described above. Therefore, it is intended that the present disclosure not be limited to the particular embodiments disclosed, but that the disclosure include all embodiments falling within the scope of the disclosure as broadly defined above.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the disclosure.

The invention claimed is:

1. A device comprising:
   a central processing unit including a first core and a second core;
   a power consumption management circuit for the central processing unit, the power consumption management circuit comprising:
      a power consumption estimation block configured to estimate power consumption of the central processing unit based on information related to a status of the central processing unit, the information related to the status of the central processing unit indicating whether the central processing unit is in a first stop state in which the first core stops running or in a second stop state in which the first core which has stopped running stays inactive until expiration of a timer;
      an activity control block configured to generate an interrupt request based on the central processing unit being in the second stop state, and use the estimated power consumption to determine a control to be applied to the central processing unit for regulating a rate of change in power consumption of the central processing unit as a function of the interrupt request, the control being to stop running of the second core of the central processing unit.

2. The device according to claim 1, wherein the activity control block is further configured to detect a change in the power consumption of the central processing unit based upon a difference between the estimated power consumption and a target power consumption exceeding a threshold.

3. The device according to claim 1, wherein the activity control block is further configured to determine a clock frequency to be used in the central processing unit; and further comprising a clock generator block configured to generate a clock signal based on the determined clock frequency, and to transmit the generated clock signal to the central processing unit.

4. The device according to claim 3, wherein the clock generator block is configured to adjust the clock frequency of the central processing unit in steps about a nominal frequency.

5. The device according to claim 1, wherein the information related to the status of the central processing unit further comprises at least one of data related to an idle status, data related to a pipeline stall, and data related to a type of instruction executed by the central processing unit.

6. The device according to claim 1, wherein information related to the status of the central processing unit is used to determine a state of the central processing unit from among a set of possible states, the set of possible states including at least one of an idle state determined when both cores of the central processing unit are in a wait for interrupt state, a first start state determined once at least one core is running, a second start state determined when the at least one core which is running stays active until expiration of a first time period, and a run state determined when the at least one core which is running stays active until expiration of a second time period.

7. The device according to claim 6, further comprising a clock generator block configured to regulate a rate of change in power consumption by manipulating a clock frequency of the central processing unit between a first clock frequency and a second clock frequency; and wherein the second clock frequency is equal to half the first clock frequency.

8. A method for managing power consumption in a central processing unit, comprising:

estimating power consumption of the central processing unit based on information related to a status of the central processing unit, the information related to the status of the central processing unit indicating whether the central processing unit is in a first stop state in which at least one core thereof stops running or in a second stop state in which the at least one core which has stopped running stays inactive until expiration of a timer;

generating an interrupt request based on the central processing unit being in the second stop state; and using the estimated power consumption to determine a control to be applied to the central processing unit to regulate a rate of change in power consumption of the central processing unit as a function of the interrupt request, the control being to stop running of at least one other core of the central processing unit.

9. The method according to claim 8, further comprising testing whether a change will occur the power consumption of the central processing unit, the change being detected based upon a difference between the estimated power consumption and a target power consumption exceeding a threshold.

10. The method according to claim 8, further comprising generating a clock signal to be used in the central processing unit using an activity control block, and transmitting the generated clock signal to the central processing unit.

11. The method according to claim 8, wherein the information related to the status of the central processing unit further comprises at least one of data related to an idle status, data related to a pipeline stall, and data related to a type of instruction executed by the central processing unit.

12. A non-transitory computer readable medium containing computer executable instructions that, when executed, cause a computer to:

estimate power consumption of a central processing unit based on information related to a status of the central processing unit, the information related to the status of the central processing unit indicating whether the central processing unit is in a first stop state in which at least one core thereof stops running or in a second stop state in which the at least one core which has stopped running stays inactive until expiration of a timer;

generate an interrupt request based on the central processing unit being in the second stop state; and use the estimated power consumption to determine a control to be applied to the central processing unit to regulate a rate of change in power consumption of the central processing unit as a function of the interrupt request, the control being to stop running of at least one other core of the central processing unit.

13. The non-transitory computer readable medium according to claim 12, wherein the computer executable instructions, when executed, further cause the computer to: test whether a change will occur the power consumption of the central processing unit, the change being detected based upon a difference between the estimated power consumption and a target power consumption exceeding a threshold.

14. The non-transitory computer readable medium according to claim 12, wherein the computer executable instructions, when executed, further cause the computer to generate a clock signal to be used in the central processing unit using an activity control block, and transmit the generated clock signal to the central processing unit.

15. The non-transitory computer readable medium according to claim 12, wherein the computer executable instructions, when executed, further cause the computer to transmit an interrupt request to the central processing unit.

16. A system, comprising:
a central processing unit; and
a power consumption management system for a central processing unit, comprising:
 a power consumption estimation block configured to estimate power consumption of the central processing unit based on information related to a status of the central processing unit, the information related to the status of the central processing unit indicating whether the central processing unit is in a first stop state in which at least one core thereof stops running or in a second stop state in which the at least one core which has stopped running stays inactive until expiration of a timer, and
 an activity control block configured to generate an interrupt request based on the central processing unit being in the second stop state, and use the estimated power consumption to determine a control to regulate a rate of change in power consumption of the central processing unit as a function of the interrupt request, the control being to stop running of at least one other core of the central processing unit.

17. The system according to claim 16, wherein the activity control block is configured to detect whether a change will occur in the power consumption of the central processing unit, the change being detected based upon a difference between the estimated power consumption and a target power consumption exceeding a threshold.

* * * * *